(12) United States Patent
Hirota et al.

(10) Patent No.: US 11,945,327 B2
(45) Date of Patent: Apr. 2, 2024

(54) CHARGING CONTROL DEVICE, WORK MACHINE, AND CHARGING CONTROL METHOD

(71) Applicant: Komatsu Ltd., Tokyo (JP)

(72) Inventors: Takashi Hirota, Tokyo (JP); Makoto Hasegawa, Tokyo (JP); Ryouta Kaneko, Tokyo (JP); Fuyuhiko Mizuno, Tokyo (JP); Takao Nagano, Tokyo (JP)

(73) Assignee: Komatsu Ltd., Tokyo (JP)

( * ) Notice: Subject to any disclaimer, the term of this patent is extended or adjusted under 35 U.S.C. 154(b) by 430 days.

(21) Appl. No.: 17/269,334

(22) PCT Filed: Aug. 16, 2019

(86) PCT No.: PCT/JP2019/032104
§ 371 (c)(1),
(2) Date: Feb. 18, 2021

(87) PCT Pub. No.: WO2020/066354
PCT Pub. Date: Apr. 2, 2020

(65) Prior Publication Data
US 2021/0197688 A1    Jul. 1, 2021

(30) Foreign Application Priority Data
Sep. 28, 2018  (JP) ................... 2018-184734

(51) Int. Cl.
*B60L 53/62* (2019.01)
*H02J 7/00* (2006.01)

(52) U.S. Cl.
CPC ............ *B60L 53/62* (2019.02); *H02J 7/0029* (2013.01); *H02J 7/0047* (2013.01)

(58) Field of Classification Search
CPC .... B60L 53/62; B60L 2200/40; H02J 7/0029; H02J 7/0047; H02J 7/00034; H02J 7/34; H02J 2310/40; Y02E 60/10; Y02T 10/70; Y02T 10/7072; Y02T 90/12; Y02T 90/14
See application file for complete search history.

(56) References Cited

U.S. PATENT DOCUMENTS 5,099,379 A * 3/1992 Lee ................ H02H 9/001
                                              361/103
5,173,652 A * 12/1992 Henkel ............. H02J 7/00
                                              320/DIG. 22

(Continued)

FOREIGN PATENT DOCUMENTS

CN    101777782 A    7/2010
CN    102377170 A    3/2012
(Continued)

*Primary Examiner* — Stacy Whitmore
(74) *Attorney, Agent, or Firm* — Locke Lord LLP

(57) ABSTRACT

A charging control device (1A) according to the present invention includes a determination part that determines whether or not an abnormality in input power occurs on the basis of input power information on the input power and a predetermined determination threshold value. The determination part makes the determination on the basis of the input power information when a predetermined time has passed after an input of the input power.

9 Claims, 6 Drawing Sheets

(56) References Cited

U.S. PATENT DOCUMENTS

| | | | | |
|---|---|---|---|---|
| 5,517,403 A * | 5/1996 | Maehara | ............... | H02M 7/538 363/47 |
| 5,596,259 A * | 1/1997 | Mino | ................... | H01M 10/44 320/157 |
| 5,635,804 A * | 6/1997 | Tanaka | ................... | B60L 15/02 318/432 |
| 5,825,155 A * | 10/1998 | Ito | ........................ | H02J 7/0013 429/149 |
| 5,894,394 A * | 4/1999 | Baba | ..................... | H02H 1/043 361/87 |
| 6,034,833 A * | 3/2000 | Jung | ..................... | G11B 19/04 |
| 8,609,289 B2 * | 12/2013 | Hasegawa | ......... | H01M 8/04664 429/432 |
| 9,702,939 B2 * | 7/2017 | Brockman | ............ | H02J 7/0031 |
| 2003/0151423 A1 * | 8/2003 | Ishii | ........................ | H02M 3/07 326/1 |
| 2005/0127879 A1 | 6/2005 | Sato et al. | | |
| 2006/0007225 A1 * | 1/2006 | Kim | ..................... | H04W 52/48 348/E5.127 |
| 2008/0122643 A1 * | 5/2008 | Kawagoe | ............. | H02J 7/0047 361/86 |
| 2010/0176764 A1 | 7/2010 | Tachikawa et al. | | |
| 2011/0234159 A1 * | 9/2011 | Ohtomo | .................... | H02J 7/02 320/109 |
| 2015/0035539 A1 * | 2/2015 | Wakida | ................ | G01R 31/327 324/418 |
| 2015/0217660 A1 * | 8/2015 | Manabe | ................. | H02M 7/44 307/23 |
| 2016/0352117 A1 | 12/2016 | Zhang | | |
| 2017/0087998 A1 * | 3/2017 | Minamii | ................ | H02J 7/1423 |
| 2018/0201137 A1 * | 7/2018 | Hirasawa | .............. | B60L 15/007 |
| 2018/0287396 A1 * | 10/2018 | Hanabusa | ............... | H02J 50/10 |
| 2019/0393702 A1 * | 12/2019 | Su | ....................... | H02J 7/00043 |
| 2020/0254888 A1 * | 8/2020 | Weiss | ..................... | F15B 15/00 |
| 2020/0335991 A1 * | 10/2020 | Tsukamoto | ............. | H02J 9/068 |

FOREIGN PATENT DOCUMENTS

| | | |
|---|---|---|
| CN | 106945534 A | 7/2017 |
| JP | H03-141589 A | 6/1991 |
| JP | 2000-125477 A | 4/2000 |
| JP | 2008-312442 A | 12/2008 |
| JP | 2009-197514 A | 9/2009 |
| JP | 2011-091878 A | 5/2011 |
| JP | 2015-136271 A | 7/2015 |
| JP | 2017-505101 A | 2/2017 |

* cited by examiner

CHARGING CONTROL DEVICE, WORK MACHINE, AND CHARGING CONTROL METHOD

TECHNICAL FIELD

The present invention relates to a charging control device, a work machine, and a charging control method.

Priority is claimed on Japanese Patent Application No. 2018-184734, filed Sep. 28, 2018, the content of which is incorporated herein by reference.

BACKGROUND ART

Electric work machines having zero emission and low noise are sometimes used for construction work in an urban area or the like. An electric work machine includes an electric motor for driving a hydraulic pump and the like, and a power storage device, such as a battery, for supplying power to the electric motor, instead of including an engine and a fuel tank.

In a case where the battery is to be charged, an operator inserts and connects a charging connector of predetermined charging equipment to an insertion port of the electric work machine. Accordingly, power for charging is supplied to the electric work machine from the charging equipment through the charging connector and the insertion port.

Patent Literature 1 discloses a power receiving device and a charging method that inhibits a current input from an AC power source when an abnormal voltage is input from the AC power source during the charging of a battery.

The above-described charging control device has a function to monitor an input voltage from charging equipment. For example, the charging control device performs cutoff of the supply of power or the like when the charging control device detects an abnormality in the input voltage.

CITATION LIST

Patent Literature

[Patent Literature 1]
Japanese Unexamined Patent Application, First Publication No. 2015-136271

SUMMARY OF INVENTION

Technical Problem

At the moment when a charging connector of charging equipment is connected to an insertion port of an electric work machine, a large current (hereinafter, referred to as "rush current") instantaneously flows due to an inductor component and a capacitor component present in a circuit. There is a possibility that the charging control device may erroneously detect an instantaneous high voltage, which is caused by the rush current, as "an abnormality in an input voltage".

In view of the problem described above, an object of the present invention is to provide a charging control device and a work machine that can appropriately determine whether or not an abnormality in an input voltage supplied from charging equipment occurs.

Solution to Problem

According to an aspect of the present invention, a charging control device includes a determination part that determines whether or not an abnormality in input power occurs on the basis of input power information on the input power and a predetermined determination threshold value. The determination part makes the determination on the basis of the input power information when a predetermined time has passed after an input of the input power.

Advantageous Effects of Invention

According to the aspect, it is possible to appropriately determine whether or not an abnormality in an input voltage supplied from charging equipment occurs.

DESCRIPTION OF EMBODIMENTS

First Embodiment

Hereinafter, a charging control device according to a first embodiment and an electric excavator that is an example of an electric work machine on which the charging control device is mounted will be described in detail with reference to FIGS. 1 to 4.

(Entire Configuration of Charging Equipment and Electric Excavator)

Figure 1:
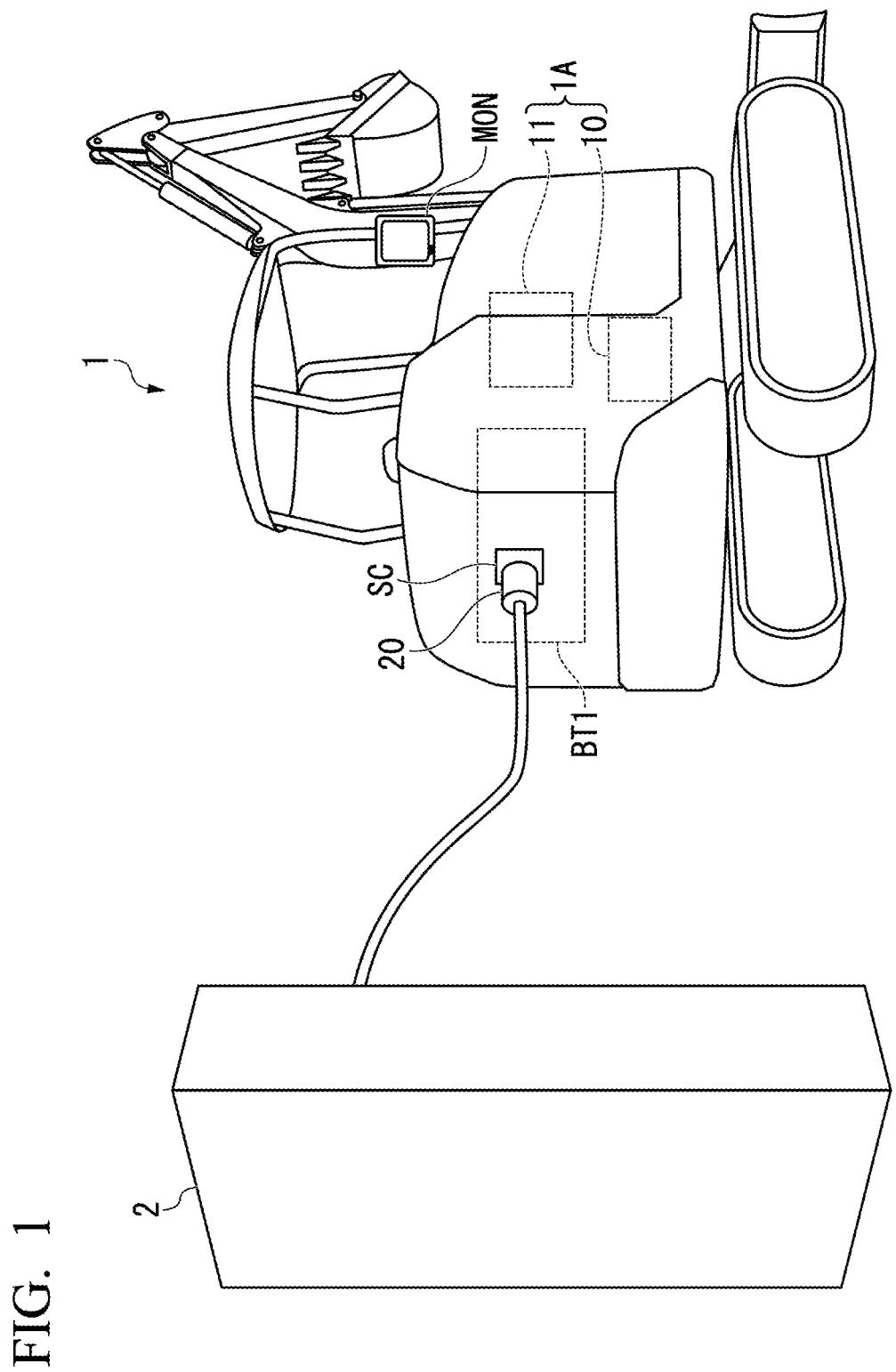
FIG. 1 is a diagram showing the entire configuration of charging equipment and an electric excavator according to a first embodiment.

FIG. 1 is a diagram showing the entire configuration of charging equipment and an electric excavator according to the first embodiment.

An electric excavator 1 is an aspect of an electric work machine and is a work machine that operates on the basis of power of a battery. The present embodiment will be described using an example where the electric work machine is an electric excavator, but the present invention is not limited to the aspect in another embodiment. In another embodiment, the electric work machine may be other work machines, such as a wheel loader.

As shown in FIG. 1, the electric excavator 1 includes a battery BT1 that supplies power to an electric motor for driving a hydraulic pump, and a charging control device 1A that controls a charging operation for the battery BT1. A back surface of the electric excavator 1 is provided with an insertion port SC to which a charging connector 20 of charging equipment 2 is to be connected. Further, a cab of the electric excavator 1 is provided with a monitor MON that notifies an operator of a charge state, such as whether or not an abnormality in an input voltage occurs. The output voltage of the battery BT1 may be set to 300 V.

The charging control device 1A includes a power controller 10 and a power supply unit 11.

The power controller 10 performs the entire control of a power source and an electric system of the electric excavator 1. The power controller 10 is a host device of the power supply unit 11 to be described later. Specifically, when the charging connector 20 is connected to the insertion port SC, the power controller 10 activates the power supply unit 11 having been in an OFF state. Then, the power controller 10 outputs a charging command to the activated power supply unit 11 and performs desired charging control.

The power supply unit 11 performs charging control for the battery BT1 according to the charging command output from the power controller 10. For example, the power supply unit 11 generates DC power, which corresponds to a command voltage (V) and a command current (A) indicated by the charging command output from the power controller 10, from AC power supplied from the charging equipment 2, and supplies the DC power to the battery BT1.

The charging equipment 2 outputs AC power of single-phase 200 V through, for example, a power transmission line. An operator who charges the battery BT1 inserts the charging connector 20 of the charging equipment 2 into the insertion port SC of the electric excavator 1.

(Functional Block Diagram of Electric Excavator)

Figure 2:
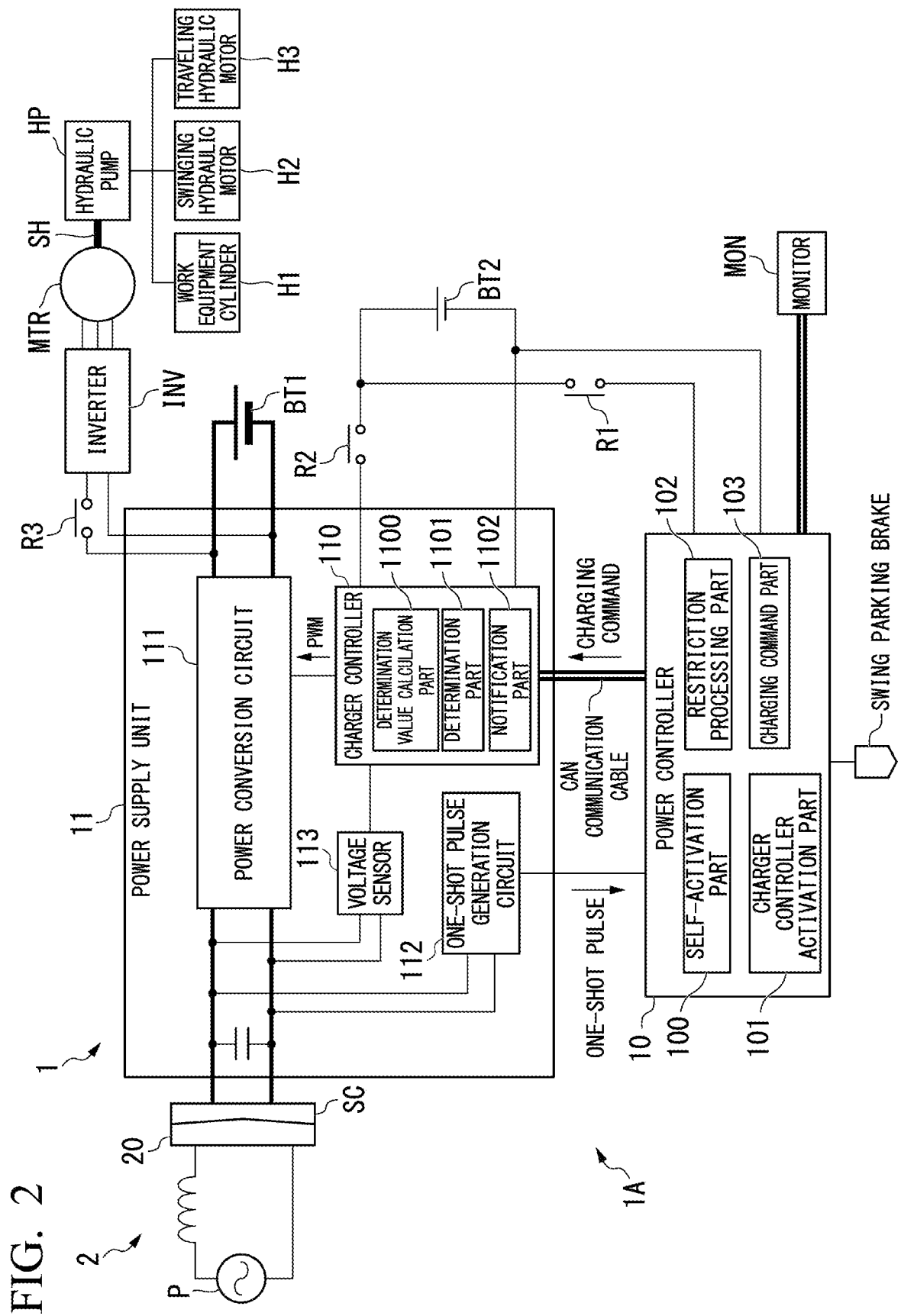
FIG. 2 is a system block diagram of the electric excavator according to the first embodiment.

FIG. 2 is a system block diagram of the electric excavator according to the first embodiment.

In FIG. 2, a power source P is a power supply source of the charging equipment 2 that supplies an AC voltage of single-phase 200 V.

An electric motor MTR shown in FIG. 2 is driven on the basis of power supplied from the battery BT1. The electric motor MTR rotationally drives a hydraulic pump HP that is connected to the electric motor MTR through a rotating shaft SH. When the hydraulic pump HP is rotationally driven, working fluid is supplied to work equipment cylinder H1, a swinging hydraulic motor H2, and a traveling hydraulic motor H3 from the hydraulic pump HP. As described above, the operation of the electric excavator 1 is performed by the supply of power to the electric motor MTR from the battery BT1.

The functions of the power controller 10 will be described in detail.

As shown in FIG. 2, the power controller 10 has functions as a self-activation part 100, a charger controller activation part 101, a restriction processing part 102, and a charging command part 103.

The self-activation part 100 performs an operation for supplying power to the power controller 10 itself when an activation signal to be described later is input to the self-activation part 100. Here, the activation signal in the present embodiment is a one-shot pulse. The activation signal may be a pulse signal or an analog signal. Specifically, the self-activation 100 is formed of a discrete circuit that is configured to turn on a switch R1 when the input of the one-shot pulse is received. Accordingly, the power controller 10 is connected to a regular power source BT2, so that the power controller 10 having been in an OFF state is activated. Here, the output voltage of the regular power source BT2 may be 24 V which is lower than that of the battery BT1.

The charger controller activation part 101 activates a charger controller 110 of the power supply unit 11. Specifically, the charger controller activation part 101 turns on a switch R2 when a predetermined condition is satisfied after the completion of the activation of the power controller 10 itself. Accordingly, the charger controller 110 is connected to the regular power source BT2, so that the charger controller 110 is activated.

The restriction processing part 102 restricts a predetermined operation of the electric excavator 1 during charging. For example, the restriction processing part 102 restricts an operation for turning on a switch R3 by the other controller while the power supply unit 11 charges the battery BT1. In this case, power is not supplied to an inverter INV and the electric motor MTR for driving the hydraulic pump, so that the operation of the hydraulic pump HP is restricted. Accordingly, the operations of the work equipment cylinder, the swinging hydraulic motor, and the traveling hydraulic motor of the electric excavator 1 are restricted, and thus the entire operation of the electric excavator 1 is restricted. Further, the restriction processing part 102 applies a swing parking brake while the power supply unit 11 charges the battery. Accordingly, the swing operation of the electric excavator 1 is restricted. Since predetermined operations of the electric excavator 1 are restricted as described above while the battery BT1 is charged by the charging equipment 2, safety during charging is ensured.

The charging command part 103 outputs a charging command, which corresponds to the charge state of the battery BT1, to the charger controller 110 of the power supply unit 11.

The functions of the power supply unit 11 will be described in detail.

As shown in FIG. 2, the power supply unit 11 includes the charger controller 110, a power conversion circuit 111, a one-shot pulse generation circuit 112, and a voltage sensor 113.

The charger controller 110 performs the entire control of the power supply unit 11. Particularly, as the charger controller 110 outputs a pulse width modulation (PWM) signal to the power conversion circuit 111 and controls the PWM signal, the charger controller 110 can apply a desired DC voltage to the battery BT1.

Other functions of the charger controller 110 will be described later.

The power conversion circuit 111 is a circuit for converting an AC voltage, which is supplied from the power source P of the charging equipment 2, into a DC voltage that is used to charge the battery BT1. The power conversion circuit 111 includes magnetic components, such as a transformer and a reactor, and a power semiconductor, and these are switched on the basis of the PWM signal output from the charger controller 110, so that an AC voltage is converted into a DC voltage.

The one-shot pulse generation circuit 112 is an aspect of a connection detection part that detects the connection of the charging connector 20 to the insertion port SC. When the one-shot pulse generation circuit 112 receives the AC voltage supplied through the charging connector 20 connected thereto, the one-shot pulse generation circuit 112 immediately generates a one-shot pulse and outputs the one-shot pulse to the power controller 10. When the power controller 10 receives the one-shot pulse, the power controller 10 starts to activate itself by the function of the self-activation part 100.

The voltage sensor 113 is a sensor that is used to measure an input voltage supplied from the power source P.

Next, the functions of the charger controller 110 will be described.

As shown in FIG. 2, the charger controller 110 includes a determination value calculation part 1100, a determination part 1101, and a notification part 1102.

The determination value calculation part 1100 acquires an input voltage supplied from the power source P through the charging connector 20, and calculates the effective value of the input voltage that is an example of input power information.

The determination part 1101 determines whether or not an abnormality in input power occurs on the basis of the input power information on the input power and a predetermined determination threshold value. In the present embodiment, specifically, the determination part 1101 determines whether or not the input voltage input through the charging connector 20 is abnormal on the basis of comparison of the effective value of the input voltage calculated by the determination value calculation part 1100 and the predetermined determination threshold value.

When the determination part 1101 determines that the input voltage is abnormal, the notification part 1102 displays the occurrence of the abnormality on the monitor MON to notify an operator of the occurrence of the abnormality.

(Processing Flow of Charging Control Device)

Figure 3:
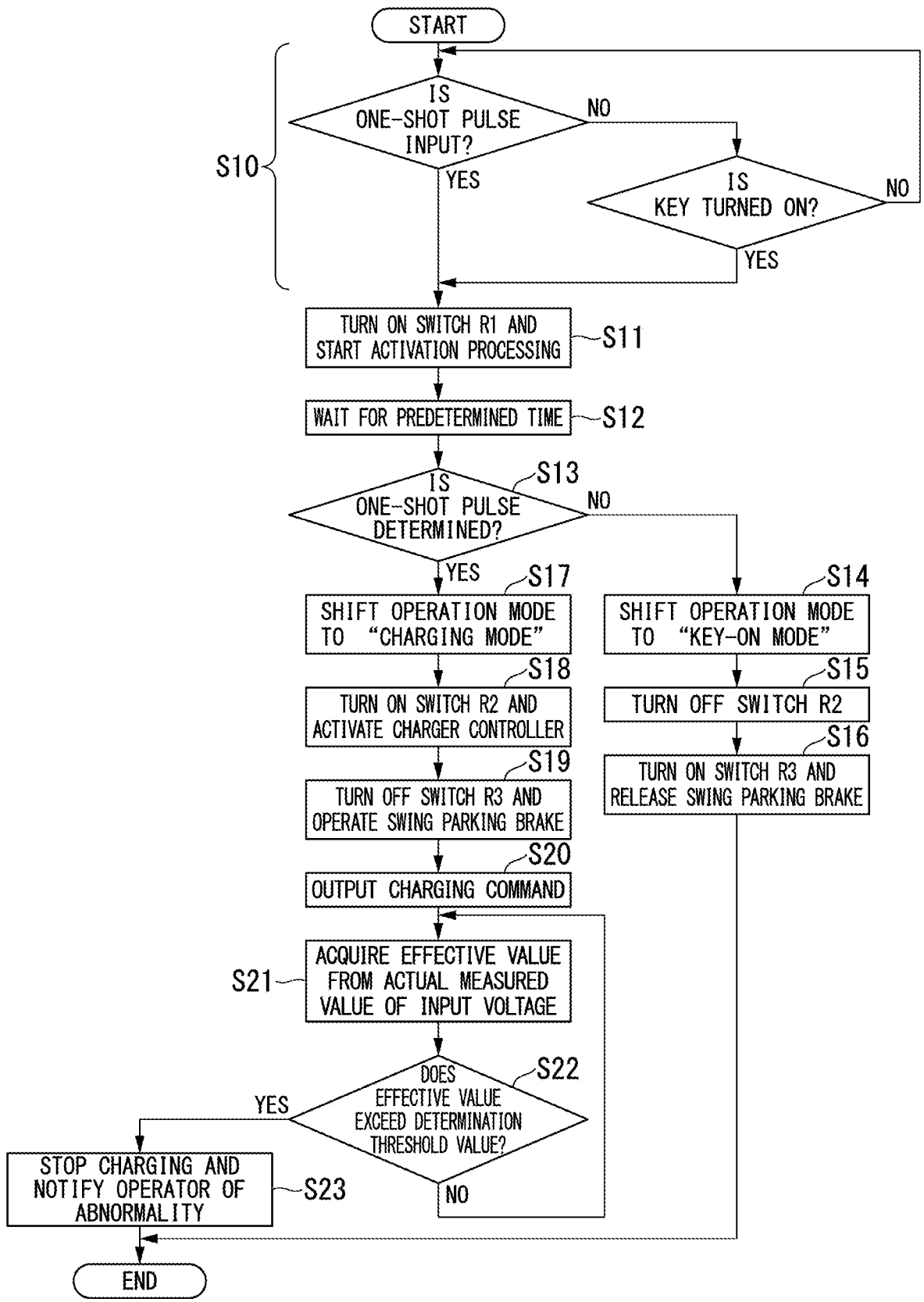
FIG. 3 is a diagram showing a processing flow of a charging control device according to the first embodiment.

FIG. 3 is a diagram showing a processing flow of the charging control device according to the first embodiment.

Hereinafter, a flow of processing of the entire charging control device 1A will be described with reference to FIG. 3.

First, the flow of processing of the power controller 10 will be described. The processing flow of Steps S10 to S16 shown in FIG. 3 is a flow of processing performed by the power controller 10, and the power controller 10 is initially in an OFF state. Further, an ignition key is also in an OFF state.

As shown in FIG. 3, first, the self-activation part 100 of the power controller 10 waits for the input of a one-shot pulse or the switching of the ignition key to an ON state.

When the charging connector 20 is connected to the insertion port SC by an operator and the one-shot pulse is input to the self-activation part 100 from the one-shot pulse generation circuit 112, or when the ignition key is in an ON state (YES in Step S10), the self-activation part 100 turns on the switch R1 to connect the regular power source BT2. Accordingly, the power controller 10 itself is connected to the regular power source BT2, so that power is supplied to the power controller 10. When power is supplied to the power controller 10 from the regular power source BT2, the power controller 10 immediately starts activation processing (Step S11).

When the activation of the power controller 10 is completed, the charger controller activation part 101 of the power controller 10 waits for a delay time determined in advance after the completion of the activation (Step S12).

When the wait of the charger controller activation part 101 for the delay time is completed in Step S12, the charger controller activation part 101 determines whether or not the power controller 10 receives a one-shot pulse from the one-shot pulse generation circuit 112, that is, whether or the input level of a one-shot pulse is "H1" (Step S13).

When the input level of the one-shot pulse is not "HI" (NO in Step S13), the power controller 10 is shifted to "key-on mode" (Step S14). After the power controller 10 is shifted to the key-on mode, the power controller 10 maintains the switch R2 in an OFF state and prevents the charger controller from being activated (Step S15). Further, the restriction processing part 102 turns on the switch R3 to make a state where power can be supplied to the electric motor MTR (Step S16).

When the input level of the one-shot pulse is "HI" (YES in Step S13), the power controller 10 is shifted to "charging mode" (Step S17). After the power controller 10 is shifted to the charging mode, the charger controller activation part 101 turns on the switch R2 to activate the charger controller 110 (Step S18). Accordingly, the charger controller 110 is connected to the regular power source BT2 and power is supplied to the charger controller 110. When the charger controller 110 is activated through the supply of power, the charger controller 110 immediately performs processing (see FIG. 4) to be described later.

When the power controller 10 is shifted to the charging mode, the restriction processing part 102 maintains the switch R3 in an OFF state to make a state where power cannot be supplied to the electric motor MTR (Step S19). Accordingly, the operation of the electric excavator 1 is restricted, and thus safety during charging can be ensured.

After the power controller 10 is shifted to "key-on mode" or "charging mode", the power controller 10 is configured to maintain the shifted mode until power is cut off. For example, after the ignition key is turned on and the power controller is shifted to "key-on mode", even though the charging connector 20 is inserted into the insertion port SC, the mode of the power controller 10 is not shifted to "charging mode" and the charger controller 110 is not turned on. Conversely, after the charging connector 20 is inserted into the insertion port SC and the power controller 10 is shifted to "charging mode", even though the ignition key is turned on, the mode of the power controller 10 is not shifted to "key-on mode" and the electric motor MTR does not start to move. Accordingly, the operation of the electric excavator 1 is restricted even though an operator is to operate the electric excavator 1 by mistake despite charging, and thus safety during charging can be ensured.

Subsequently, the charging command part 103 of the power controller 10 outputs the charging command, which indicates DC power corresponding to the charge state of the battery BT1, to the charger controller 110 and causes charging to start (Step S20).

Next, the flow of processing of the charger controller 110 will be described. The processing flow of Steps S21 to S23 shown in FIG. 3 is a processing flow relating to the detection of an abnormality in the input voltage among the functions of the charger controller 110 and is performed immediately after the charger controller 110 is activated by the power controller 10.

The determination value calculation part 1100 of the charger controller 110 acquires the actual measured value of the input voltage for one cycle through the voltage sensor 113. Then, the determination value calculation part 1100 calculates the effective value of the input voltage for one cycle (Step S21).

Subsequently, the determination part 1101 of the charger controller 110 determines whether or not the effective value of the input voltage acquired in Step S21 exceeds the predetermined determination threshold value (Step S22).

When the effective value of the input voltage does not exceed the determination threshold value (NO in Step S22), the charger controller 110 determines that the input voltage is normal, and returns to the processing of Step S21 without performing special processing on the basis of this determination.

When the effective value of the input voltage exceeds the determination threshold value (YES in Step S22), the determination part 1101 determines that the input voltage is abnormal. The notification part 1102 of the charger controller 110 receives the determination result by the determination part 1101 and notifies an operator of the abnormality through the monitor MON (Step S23). A method of turning on an alarm lamp, making a warning sound, or the like can be employed for the notification of the abnormality.

Further, when the effective value of the input voltage exceeds the determination threshold value (YES in Step S22), the charger controller turns off a switch (not shown) provided between the insertion port SC and the power conversion circuit 111 to cut off an AC voltage to be supplied and to stop charging the battery BT1.

(Operation and Effects)

Figure 4:
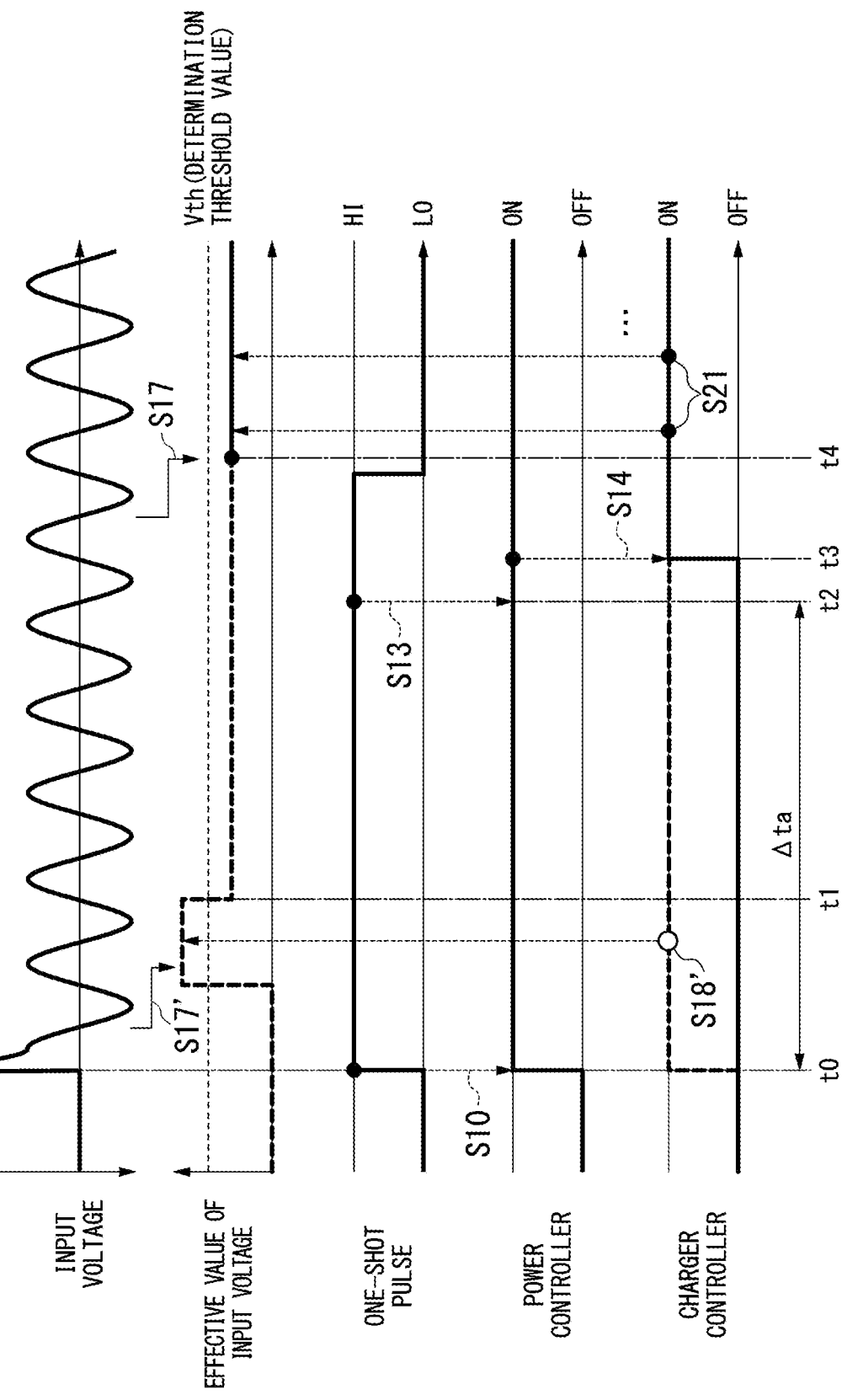
FIG. 4 is a diagram showing the operation and effects obtained from the charging control device according to the first embodiment.

FIG. 4 is a diagram showing the operation and effects obtained from the charging control device according to the first embodiment.

Next, the operation and effects obtained from the processing of the charging control device 1A shown in FIGS. 3 and 4 will be described with reference to FIG. 4.

A timing chart shown in FIG. 4 shows an input voltage input through the charging connector 20, the effective value of the input voltage calculated by the charger controller 110 (determination value calculation part 1100), the waveform of a one-shot pulse output from the one-shot pulse generation circuit 112, the switching of ON/OFF of the power controller 10, and the switching of ON/OFF of the charger controller 110, in the same time series.

The timing chart shown in FIG. 4 is started from a state where both the power controller 10 and the charger controller 110 are in an OFF state and the charging connector 20 is not connected to the insertion port SC. As shown in FIG. 4, it is assumed that an operator connects the charging connector 20 to the insertion port SC at a time t0.

The input voltage temporarily rises at the time t0 due to the generation of a rush current. Immediately after that, the input voltage is immediately settled to a stable AC voltage of a single-phase 200 V.

Further, a one-shot pulse is changed to a HI level from a LO level by the one-shot pulse generation circuit 112 at the time t0. When the one-shot pulse of the HI level is input to the power controller 10, the power controller 10 having been in an OFF state is switched to an ON state (Step S11). Some time lag is actually present until the activation of the power controller 10 is completed after the input of the one-shot pulse, but it is shown that the power controller 10 is activated at the same time t0 in FIG. 4 for simplification of the drawing.

The power controller 10 activated at the time t0 waits for a delay time Δta (Step S12). The power controller 10 checks the one-shot pulse at a time t2 (Step S13), and activates the charger controller 110 at a subsequent time t3 when the input level of the one-shot pulse is "HI" (Step S14). Accordingly, the charger controller 110 having been in an OFF state is switched to an ON state at the time t3.

The charger controller 110 switched to an ON state at the time t3 immediately starts processing for detecting an abnormality in the input voltage that is a processing flow shown in FIG. 4. As a result, the effective value of the input voltage is acquired at a time t4 after the time t3. That is, a time when the effective value of the input voltage is acquired for the first time after the completion of the activation of the charger controller 110 is a time after a high voltage generated by the rush current is sufficiently settled. Accordingly, the charger controller 110 can prevent erroneous detection, which is caused by the rush current, in the processing for detecting an abnormality in the input voltage.

In order to describe the effects of the present example, a case where the power controller 10, which is activated at the time t0, immediately activates the charger controller 110 without waiting for the delay time Δta (Step S12) will be described. In this case, the charger controller 110 is activated immediately after the activation of the power controller 10, and calculates the effective value of the input voltage in a stage where the input voltage is not settled, that is, in a stage before the time t1 (see Step S17' in FIG. 4). Therefore, the effective value of the input voltage exceeds the determination threshold value Vth (see Step S18' in FIG. 4), and the charger controller 110 erroneously detects an abnormality in the input voltage.

As described above, according to the charging control device 1A of the first embodiment, the power controller 10 waits for the delay time Δta after the completion of the activation thereof and then activates the charger controller 110. That is, the determination part 1101 is activated when a predetermined time has passed after the input of the input power. Accordingly, the charger controller 110 starts the processing for detecting an abnormality after a temporary high voltage, which is generated at the time of connection of the charging connector 20, is sufficiently settled. Therefore, an erroneous detection of an abnormality in the input voltage caused by the rush current can be suppressed.

As described above, according to the charging control device 1A of the first embodiment, it is possible to appropriately determine whether or not an abnormality in the input voltage supplied from the charging equipment 2 occurs.

Second Embodiment

Next, a charging control device according to a second embodiment and an electric excavator on which the charging control device is mounted will be described in detail with reference to FIGS. 5 to 6.

Since the functional configuration of a power controller 10 and a charger controller 110 according to the second embodiment is the same as that of the first embodiment shown in FIG. 2, the description thereof will be omitted.

(Processing Flow of Charging Control Device)

Figure 5:
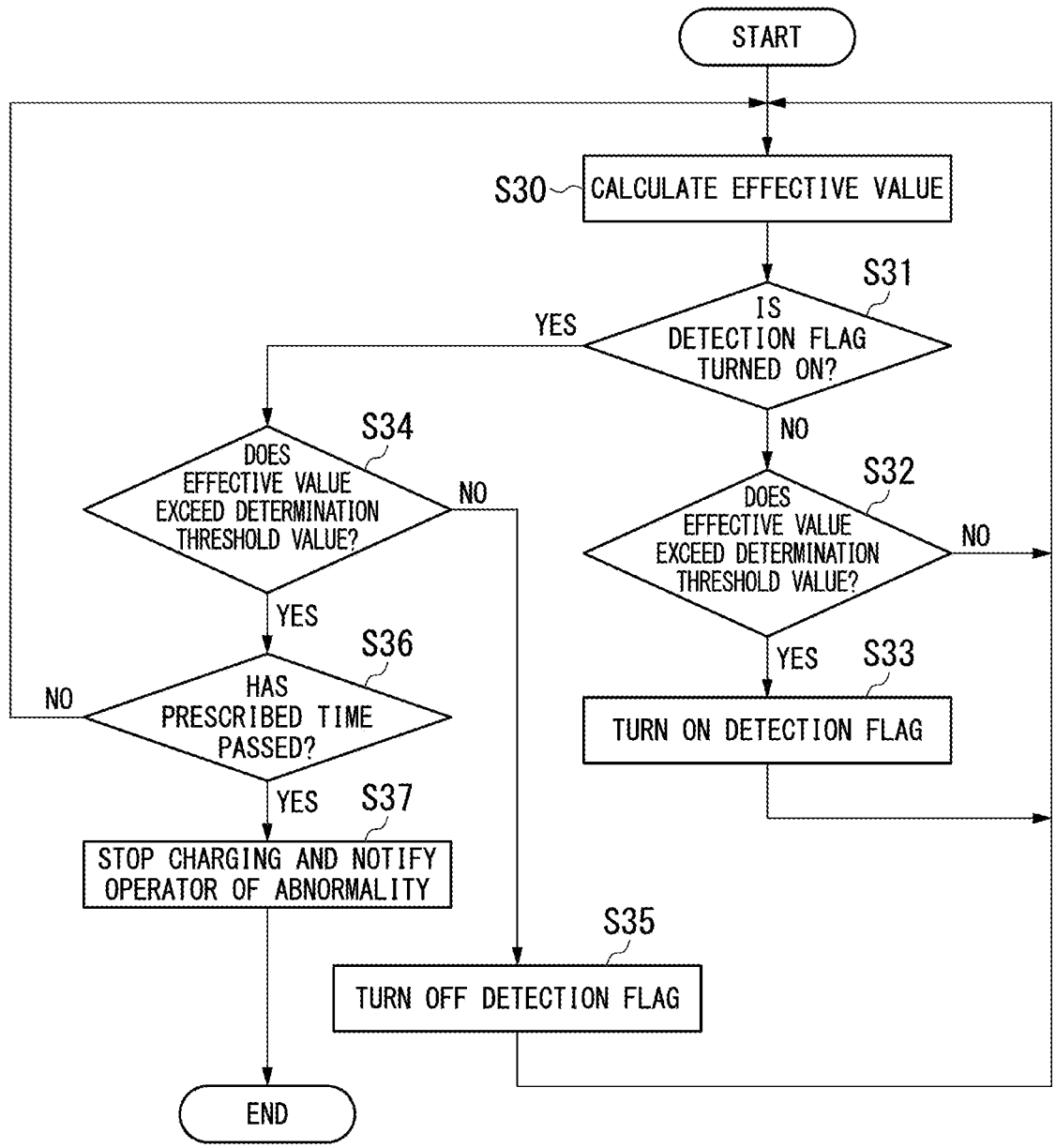
FIG. 5 is a diagram showing a processing flow of a charging control device according to a second embodiment.

FIG. 5 is a diagram showing a processing flow of the charging control device according to the second embodiment.

The flow of processing of the charger controller 110 according to the second embodiment will be described below with reference to FIG. 5. The processing flow shown in FIG. 5 is a processing flow relating to the detection of an abnormality in an input voltage among the functions of the charger controller 110 and is performed immediately after the charger controller 110 is activated by the power controller 10.

The determination value calculation part 1100 of the charger controller 110 acquires the actual measured value of the input voltage for one cycle through the voltage sensor 113. Then, the determination value calculation part 1100 calculates the effective value of the input voltage for one cycle (Step S30).

Subsequently, the determination part 1101 of the charger controller 110 determines whether or not a detection flag is turned on (Step S31). Here, "detection flag" is a flag that is turned on when the effective value of the input voltage which exceeds a determination threshold value is detected.

When the detection flag is off (NO in Step S31), the determination part 1101 determines whether or not the effective value of the input voltage acquired in Step S30 exceeds the predetermined determination threshold value (Step S32). When the effective value of the input voltage does not exceed the determination threshold value (NO in Step S32), the charger controller 110 determines that the input voltage is normal, and returns to the processing of Step S30 without performing special processing on the basis of this determination.

On the other hand, when the effective value of the input voltage exceeds the determination threshold value (YES in Step S32), the determination part 1101 turns on the detection flag (Step S33) and performs the processing of Step S30 again.

When the detection flag is turned on (YES in Step S31), the determination part 1101 determines again whether or not the effective value of the input voltage, which is acquired in Step S30 after the effective value of the input voltage exceeds the determination threshold value for the first time, exceeds the determination threshold value (Step S34).

When the effective value of the input voltage does not exceed the determination threshold value (NO in Step S34), the determination part 1101 determines that the effective value of the input voltage exceeds the determination threshold value once but the input voltage is then settled instantly, and returns the detection flag to an OFF state (Step S35) and returns to the processing of Step S30 on the basis of this determination.

When the effective value of the input voltage exceeds the determination threshold value (YES in Step S34), the determination part 1101 determines whether or not a time determined in advance (hereinafter, also referred to as a predetermined time) has passed after the effective value of the input voltage exceeds the determination threshold value for the first time (Step S36). When the predetermined time has not passed after the effective value of the input voltage exceeds the determination threshold value for the first time (NO in Step S36), the determination part 1101 returns to the processing of Step S30 while maintaining the detection flag in an ON state.

A case where the detection flag is turned on, the effective value of the input voltage exceeds the determination threshold value, and the predetermined time has passed (YES in Step S36) means that the effective value of the input voltage continuously exceeds the determination threshold value for the predetermined time.

Accordingly, in this case, the determination part 1101 determines that an abnormality occurs in the input voltage. Then, the notification part 1102 of the charger controller 110 notifies an operator of the abnormality through the monitor MON on the basis of the determination result by the determination part 1101 (Step S37). Further, the charger controller 110 stops charging the battery BT1.

(Operation and Effects)

Next, the operation and effects obtained from the processing of the charging control device 1A shown in FIG. 5 will be described with reference to FIG. 6. Similar to the first embodiment (FIG. 4), a timing chart shown in FIG. 6 shows an input voltage input through the charging connector 20, the effective value of the input voltage calculated by the charger controller 110 (determination value calculation part 1100), the waveform of a one-shot pulse output from the one-shot pulse generation circuit 112, the switching of ON/OFF of the power controller 10, and the switching of ON/OFF of the charger controller 110, in the same time series.

Figure 6:
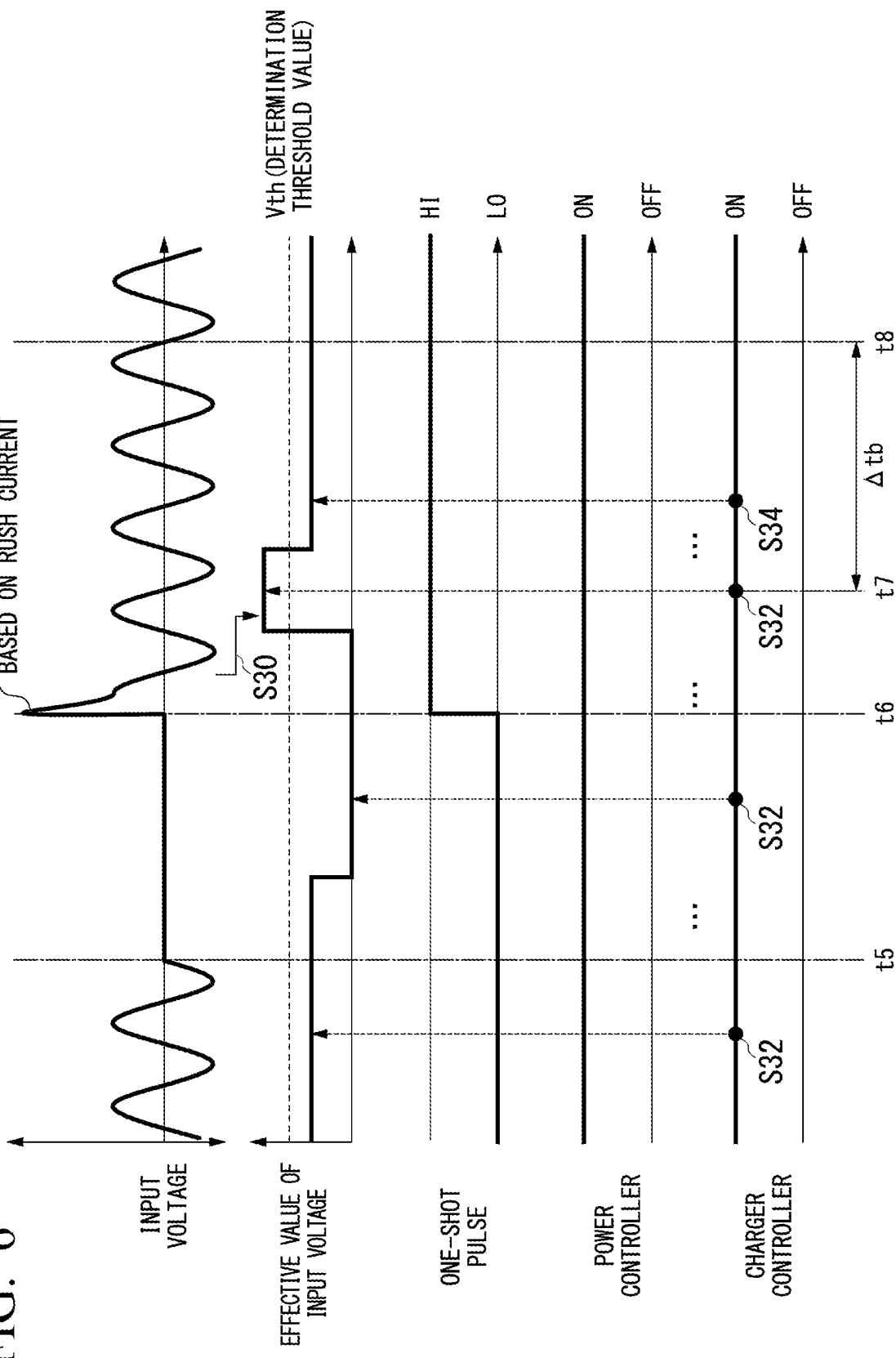
FIG. 6 is a diagram showing the operation and effects obtained from the charging control device according to the second embodiment.

The timing chart shown in FIG. 6 is started from a state where a sufficient time has passed after the connection of the charging connector 20 to the insertion port SC and both the power controller 10 and the charger controller 110 are in an ON state. Here, it is assumed that a contact failure occurs between the charging connector 20 and the insertion port SC due to an operator's operation or the like and the charging connector 20 is temporarily cut off between a time t5 and a time t6.

As shown in FIG. 6, the input voltage becomes zero between the time t5 and the time t6 due to the cutoff of the charging connector 20. Further, a rush current is generated again at the time t6 when connection is restored, and the input voltage temporarily rises due to the rush current.

Since a period between the time t5 and the time t6 is sufficiently short, the power controller 10 and the charger controller 110 maintain an ON state in this period.

Since the charger controller 110 is in an ON state at the time t6 when the rush current is generated, the charger controller 110 determines that the effective value of the input voltage, which is calculated and acquired at a time t7 immediately after the time t6 (Step S30), exceeds the determination threshold value Vth (Step S32). However, the charger controller 110 according to the present embodiment does not determine that "an abnormality in the input voltage has occurred" at this point in time. After that, until a predetermined time Δtb passes from the time t7, that is, until a time t8 passes, the charger controller 110 continuously acquires the effective value of the input voltage and determines whether or not the effective value of the input voltage exceeds the determination threshold value Vth (Step S34). Then, when the effective value of the input voltage is settled to be equal to or smaller than the determination threshold value Vth before the predetermined time Δtb has passed from the time t7 (NO in Step S34), the charger controller 110 does not determine that the input voltage is abnormal.

As described above, according to the charging control device 1A of the second embodiment, when the determination part 1101 of the charger controller 110 determines that the effective value of the input voltage exceeds the determination threshold value Vth at the time t7 that is a first time, the determination part 1101 repeatedly determines whether or not the effective value of the input voltage continuously exceeds the determination threshold value Vth for the predetermined time Δtb from the first time.

That is, the determination part 1101 determines whether or not an abnormality occurs in the input voltage on the basis of a change in input power information until a predetermined time passes after the input of the input power. Then, when the effective value of the input voltage continuously exceeds the determination threshold value Vth for the predetermined time Δtb from the first time, an abnormality in the input voltage is detected.

According to this, an erroneous detection of an abnormality in the input voltage caused by the rush current can be further suppressed. Particularly, even in a case where the rush current is input when the power controller 10 and the charger controller 110 are in an ON state as shown in FIG. 6, an erroneous detection of an abnormality in the input voltage caused by the rush current can be suppressed.

The charging control device 1A according to the second embodiment has been described in the above description as a case where both the power controller 10 and the charger controller 110 are in an ON state, but the present invention is not limited to this aspect. For example, the charging control device 1A according to the second embodiment can be used also in a case where the power controller 10 and the charger controller 110 are switched to an ON state from an OFF state.

Modification Example

The charging control devices 1A according to the first and second embodiments have been described in detail above, but a specific aspect of the charging control device 1A is not limited to the above-described charging control device, and various design changes or the like can be applied without departing from the scope.

For example, the charging control device 1A according to the second embodiment has been described as a charging control device in which the power controller 10 and the charger controller 110 are separately activated and operated, but the present invention is not limited to this aspect in another embodiment. A charging control device 1A according to another embodiment may be a charging control device in which the power controller 10 and the charger controller 110 are formed integrally.

Further, the power controller 10 in the second embodiment has been described as a power controller that delays the activation of the charger controller 110 by a delay time Δta as a predetermined period after the activation of the power controller 10 itself in the same manner as the first embodiment, but the present invention is not limited to this aspect.

That is, a power controller 10 according to another embodiment may not necessarily have a function to delay the activation of the charger controller 110. Even in such an aspect, an erroneous detection of an abnormality in the input voltage caused by a rush current can be suppressed on the basis of the functions of the charger controller 110 according to the second embodiment (the processing flow shown in FIG. 5).

Further, a charger controller 110 according to a modification example of the second embodiment may determine that an abnormality does not occur in the input voltage until a predetermined time passes after the effective value of the input voltage exceeds the determination threshold value, regardless of whether or not the effective value of the input voltage exceeds the determination threshold value.

Furthermore, a charger controller 110 according to another modification example of the second embodiment may interrupt the determination of whether or not the effective value of the input voltage exceeds the determination threshold value until a predetermined time passes after the effective value of the input voltage exceeds the determination threshold value, and may resume the determination when the predetermined time has passed.

The charging control devices 1A according to the first and second embodiments have been described as a charging control device that detects an abnormality in the input voltage input through the charging connector 20, but the present invention is not limited thereto in another embodiment. A charging control device 1A according to another embodiment may detect an abnormality in an input current input through the charging connector 20. That is, the input power information is not limited to the effective value of the input voltage and may be, for example, the effective value of the input current. Further, the input power information is not limited to the effective value of the input voltage or the input current, and may be the amplitude value, the average value, or the like of the input voltage or the input current.

Although some embodiments of the present invention have been described above, these embodiments have been presented as examples and are not intended to limit the scope of the invention. These embodiments can be implemented in other various forms, and various omissions, alterations, and changes can be made within the scope without departing from the gist of the invention. These embodiments or modifications thereof are included in the scope or gist of the invention and are also included in the scope of the invention described in the claims and the equivalents thereof.

INDUSTRIAL APPLICABILITY

According to the present invention, it is possible to appropriately determine whether or not an abnormality in an input voltage supplied from charging equipment occurs.

REFERENCE SIGNS LIST

1 Electric excavator (electric work machine)
1A Charging control device
10 Power controller
100 Self-activation part
101 Charger controller activation part
102 Restriction processing part
103 Charging command part
11 Power supply unit
110 Charger controller
1100 Determination value calculation part
1101 Determination part
1102 Notification part
111 Power conversion circuit
112 One-shot pulse generation circuit (connection detection part)
113 Voltage sensor
2 Charging equipment
20 Charging connector
BT1 Battery
BT2 Regular power source
P Power source
MON Monitor
INV Inverter
MTR Electric motor
SC Insertion port

The invention claimed is:

1. A charging control device comprising:
a determination part that determines whether or not an abnormality in input power occurs on the basis of input power information on the input power and a predetermined determination threshold value; and
an activation part that supplies, on the basis of a determination of whether or not a predetermined signal that is output from a start time when an input of the input power is started is present, power to the determination unit, which is in a state where no power is supplied at the start time, to activate the determination unit,
wherein the activation part makes the determination of whether or not the predetermined signal is present when a predetermined time has passed after the input of the input power is started.

2. The charging control device according to claim 1, wherein the input power information is an effective value of a voltage of the input power.

3. The charging control device according to claim 2, wherein the determination part makes the determination on the basis of a change in the input power information until a predetermined time passes after a relationship between the input power information and the determination threshold value satisfies a predetermined condition.

4. A work machine comprising:
the charging control device according to claim 3.

5. A work machine comprising:
the charging control device according to claim 2.

6. The charging control device according to claim 1, wherein the determination part makes the determination on the basis of a change in the input power information until a predetermined time passes after a relationship between the input power information and the determination threshold value satisfies a predetermined condition.

7. A work machine comprising:
the charging control device according to claim 6.

8. A work machine comprising:
the charging control device according to claim 1.

9. A charging control method comprising:
a determination step of determining, by a determination part of a charging control device, whether or not an abnormality in input power occurs on the basis of input power information on the input power and a predetermined determination threshold value; and
an activation step of supplying, by an activation part of the charging control device, on the basis of a determination of whether or not a predetermined signal that is output from a start time when an input of the input power is started is present, power to the determination unit, which is in a state where no power is supplied at the start time, to activate the determination unit,
wherein in the activation step, the activation part makes the determination of whether or not the predetermined signal is present when a predetermined time has passed after the input of the input power is started.

* * * * *